United States Patent
Chen et al.

(10) Patent No.: US 7,229,537 B2
(45) Date of Patent: Jun. 12, 2007

(54) COMPOSITE OXYGEN ION TRANSPORT ELEMENT

(75) Inventors: Jack C. Chen, Getzville, NY (US); Charles J. Besecker, Batavia, IL (US); Hancun Chen, Williamsville, NY (US); Earil T. Robinson, Mentor, OH (US)

(73) Assignees: Praxair Technology, Inc., Danbury, CT (US); BP Corporation North America, Inc., Warrenville, IL (US)

(*) Notice: Subject to any disclaimer, the term of this patent is extended or adjusted under 35 U.S.C. 154(b) by 406 days.

(21) Appl. No.: 10/864,577

(22) Filed: Jun. 10, 2004

(65) Prior Publication Data
US 2005/0061663 A1   Mar. 24, 2005

Related U.S. Application Data

(60) Provisional application No. 60/485,739, filed on Jul. 10, 2003.

(51) Int. Cl.
*C25B 13/04* (2006.01)

(52) U.S. Cl. ............ 204/295; 429/30; 429/33; 502/4; 95/54; 95/45; 96/4; 96/6; 96/10; 96/11; 428/305.5; 428/307.3

(58) Field of Classification Search ............... 204/295, 204/296; 429/30, 33; 502/4; 95/54, 45; 96/4, 11, 6, 10; 428/305.5, 307.3
See application file for complete search history.

(56) References Cited

U.S. PATENT DOCUMENTS

| | | | |
|---|---|---|---|
| 5,240,480 A * | 8/1993 | Thorogood et al. | 96/4 |
| 5,911,860 A | 6/1999 | Chen et al. | 204/295 |
| 5,938,822 A | 8/1999 | Chen et al. | 96/11 |
| 6,200,541 B1 | 3/2001 | Kleefisch et al. | 422/211 |
| 6,514,314 B2 | 2/2003 | Sirman et al. | 95/54 |

\* cited by examiner

*Primary Examiner*—Bruce F. Bell
(74) *Attorney, Agent, or Firm*—David M. Rosenblum

(57) ABSTRACT

A composite oxygen ion transport element that has a layered structure formed by a dense layer to transport oxygen ions and electrons and a porous support layer to provide mechanical support. The dense layer can be formed of a mixture of a mixed conductor, an ionic conductor, and a metal. The porous support layer can be fabricated from an oxide dispersion strengthened metal, a metal-reinforced intermetallic alloy, a boron-doped $Mo_5Si_3$-based intermetallic alloy or combinations thereof. The support layer can be provided with a network of non-interconnected pores and each of said pores communicates between opposite surfaces of said support layer. Such a support layer can be advantageously employed to reduce diffusion resistance in any type of element, including those using a different material makeup than that outlined above.

21 Claims, 6 Drawing Sheets

COMPOSITE OXYGEN ION TRANSPORT ELEMENT

CROSS REFERENCE TO RELATED APPLICATIONS

This application is related to U.S. Provisional Patent Application Ser. No. 60/485,739 filed Jul. 10, 2003 which is hereby incorporated by reference as if fully set forth herein.

U.S. GOVERNMENTAL INTEREST

This invention was made with United States Government support under Cooperative Agreement number DE-FC26-01NT41096 awarded by the U.S. Department of Energy, National Energy Technology Laboratory. The United States Government has certain rights in this invention.

FIELD OF THE INVENTION

The present invention relates to a composite oxygen ion transport element having at least a dense layer capable of transporting oxygen ions and electrons and a support layer that incorporates a network of non-interconnected pores to reduce diffusion resistance. More particularly, the present invention relates to such a composite oxygen ion transport element in which the support layer is fabricated from a metal that is resistant to creep at high operational temperatures. Even more particularly, the present invention relates to such a composite oxygen ion transport element in which the dense layer is made up of a mixed conductor, an ionic conductor and a metal and the support layer is fabricated from the metal that is resistant to creep at high operational temperatures.

BACKGROUND OF THE INVENTION

Oxygen transport membrane elements incorporate ceramic materials, that when subjected to elevated temperatures and an oxygen partial pressure difference, are capable of transporting oxygen ions. In such membrane elements, an oxygen containing feed is contacted with one side of the membrane element designated as the cathode side. Oxygen ionizes by gaining electrons and the resultant oxygen ions are transported to an opposite side of the membrane designated as the anode side. At the anode side of the membrane element, the oxygen ions lose electrons to form elemental oxygen, or react with other chemical species to form oxygen containing compounds. Such oxygen transport membrane elements can be used to produce oxygen or to use the separated oxygen to form a variety of compounds and mixtures such as synthesis gas mixtures containing hydrogen and carbon monoxide.

Synthesis gas has several commercially important applications. A synthesis gas with a nominal $H_2/CO$ ratio of 2 is required by the Low Temperature Fischer-Tropsch synthesis reaction to make a highly paraffinic synthetic diesel fuel oil. Similarly, methanol is synthesized from a synthesis gas with a nominal composition whereby $(H_2-CO_2)/(CO+CO_2)$ is greater than or equal to 2. Other products from synthesis gas include oxo-alcohols, dimethyl ether and hydrogen.

In a mixed conducting ceramic material useful in forming an oxygen transport membrane element, both oxygen ions and electrons are conducted and the electrons are transported through the material back to the cathode side to ionize the oxygen. In an ionic material, only the oxygen ions are conducted. A separate electrical pathway has to be created to conduct the electrons in such a material. The separate pathway can be a metallic phase and in such case, the membrane material is referred to as a dual conductor. The separate pathway can also be provided by electrodes and electrical wiring.

The ceramic material can be used as a dense layer alone. A dense layer is so named because it is gas tight and is either a solid or a porous material having no interconnected through porosity. The dense layer serves as a pathway for the oxygen ions to be transported from the cathode to the anode side of the membrane. In a composite oxygen ion transport element, sometimes referred to in the art as a composite oxygen transport membrane, the dense layer is applied as a thin film onto a porous support that provides mechanical strength. In general, the oxygen flux across a dense layer is inversely proportional to its thickness. Thus, dense layers constituting thinner films can produce higher oxygen fluxes, reduced area, and lower operating temperatures. There can be intermediate porous layers between the dense layer and the support. The mechanical support itself can be inert and as such, is incapable of conducting oxygen ions, or can be formed of oxygen ion conducting materials. The oxygen ion conducting materials can be the same material as the dense layer.

The inventors have found that the support layer itself limits the performance of the membrane by acting as a barrier that reduces the oxygen flux. Although support layers are porous, in the prior art, the pores are interconnected and of very small size. As a result, the diffusion resistance present by the support to the oxygen is quite high. To enhance gas diffusion, ceramic substrate materials are made highly porous. Many technologies have been developed to manufacture ceramic porous bodies with different porosity and pore size distributions for different applications. In the most common method, a ceramic starting powder is mixed with fugitive substances and binder. The fugitive substances, such as starch and graphite, act as pore formers for the ceramic bodies. The pore former is then removed during burn-off stage leaving pores in the ceramic body after sintering process. The foregoing process has successfully been used to form porous ceramic substrates having a porosity of between about 30% and about 40% and with a pore size of between about 1 and about 20 μm.

In order to fabricate highly porous ceramic supports, that is having a porosity of above 40% and a pore size greater than 20 microns, a large amount of pore former is added to the starting powder to increase the porosity of the support. However, the resultant highly porous materials have been found to be too weak to be successfully used in oxygen transport membrane applications. U.S. Pat. No. 6,200,541 contemplates the use of strong metal alloys. However, the resultant support layer is formed by compaction and sintering. Such process results in porous structures having small pore sizes of about 5 microns and therefore, some degree of diffusion resistance.

Another host of problems with composite oxygen ion transport elements involve breakage of the support layer and the dense layer and separation of the dense layer from the support layer during long term high temperature use. Some of the foregoing problems are particularly pernicious during periods of thermal cycling between operational and turn down temperatures and when the use involves chemical production such as synthesis gases. Such problems can be virtually nonexistent at low temperatures involving uses that solely involve the production of oxygen.

As indicated above, in high stress environments, ceramic substrates that are used as supports for composite oxygen transport membranes are plagued by problems related to cracking and toughness leading to catastrophic failure. The foregoing problems result from high operational temperatures, namely, above 1000° C., at which the composite oxygen ion transport element is employed in chemical reaction. At such high temperatures, the ceramics, generally perovskites, used for the dense and supporting layers are particularly susceptible to a well known material phenomena known as creep. This problem is particularly exacerbated where such membranes are used as an element of a reactor in which a hydrocarbon is burned for such purposes as forming synthesis gas. The effect of creep when pressure is applied to the exterior surface of a tubular form of an oxygen ion transport membrane element is seen over time as a collapsed, flattened tube.

An attempt to address the strength problem is disclosed in U.S. Pat. No. 5,911,860 (hereinafter, the "860 Patent"). In this patent, a membrane is fabricated from either two phases, an oxygen ion conducting material such as a mixed conductor and a metallic phase or three phases that further include an ionic conductor. The second metallic phase improves the mechanical properties of the membrane and can relieve compositional and other stresses generated during sintering and cooling. U.S. Pat. No. 5,938,822, utilizes the dual phase materials of the '860 patent to form a dense layer with thin porous coatings on opposite surfaces of the dense layer to enhance the rate of surface reactions. The aforesaid structure can be self supporting, that is supported from the dense layer, or supported on a porous support that can be formed of metal.

The problem seen in both of these patents is that the metal phase is not present above the percolation threshold and as such, does not contribute to the separation. Hence, such a material is also not as efficient in terms of oxygen ion transport on a volumetric basis as a membrane formed of the mixed conducting perovskite alone.

An attempt to produce an improved multiphase material for both the dense layer and the porous support layer is disclosed in U.S. Pat. No. 6,514,314 which discloses the use of a mixed conducting perovskite and an ionic conductor that is present in an amount that is above the percolation threshold. The ionic conductor therefore not only enhances properties such as strength, creep resistance, and chemical stability, but also, it is able to contribute to the ionic conduction within the material. The mixed conducting phase significantly contributes to the required electronic transport and both the mixed and ionically conducting phases contribute to the oxygen ion transport. Hence, a particularly robust structure can be produced that can also efficiently conduct oxygen ions on a volumetric basis. The problem with the above patent is that the inherent brittleness of the ceramic material can still cause the catastrophic failure during operation, especially, under transient composition changes.

Structural ceramics (e.g. yttria or ceria toughened zirconia) have been proposed for potential support applications. However, these materials have relatively low thermal expansion coefficients relative to dense layer mixed conducting materials, typically a perovskite. A significant thermal expansion coefficient mismatch, generally greater than 1 ppm/° K, leads to cracking and degradation of the dense layer. Often equal to the thermal expansion coefficient mismatch, are the compositional stresses that are produced by the expansion of the ceramic that is due to the transport of oxygen ions through the membrane. These compositional stresses are particularly severe when a hydrocarbon is reacted with the permeated oxygen, creating extremely low oxygen partial pressure conditions on the anode side of the membrane.

U.S. Pat. No. 5,938,822, mentioned above, discloses the use of a metal support layer as does U.S. Pat. No. 6,200,541. The use of a metal support layer is particularly advantageous in that it helps solve yet another problem involving mounting the ion transport element while sealing the element to its mounting, for instance, a tubesheet of a reactor. Metals while not being brittle are nevertheless subject to creep at high temperatures. Additionally, in the pure oxygen and highly oxidative environment in which oxygen ion transport elements operate, metals also suffer failure due to oxidation.

As will be discussed, the present invention provides a composite oxygen ion transport element that utilizes a support that has less diffusion resistance than the prior art and therefore acts to improve the flux performance of the element. Furthermore, other features of the present invention involve a composite oxygen ion transport element with proven ability to be thermally cycled without degradation of the element and that can use metallic supports that are highly resistant to creep and oxidation at high operational temperature of about 1000° C. Moreover such metallic supports can be constructed in accordance with the low diffusion feature of the present invention.

SUMMARY OF THE INVENTION

In one aspect, the present invention provides a composite oxygen ion transport element that is specifically designed to reduce the diffusion resistance contributed by the support. In accordance with this aspect of the present invention, a layered structure is provided that comprises a dense layer to transport oxygen ions and electrons and a porous support layer to provide mechanical support for the layered structure. The porous support layer has a network of non-interconnected pores and each of the pores communicates between opposite surfaces of said support layer. The term, "non-interconnected" as used herein and in the claims with respect to the pores means the pores do not connect nor cross one another. Since the pores are non-interconnected, a rather straight path is provided that will decrease the diffusion resistance through the support layer. It is to be noted that non-interconnected porous layers have been used as interconnect layers in stacked fuel cell elements which are supported by a solid support. The results of the support layer as described above with respect to a composite oxygen ion transport element is nevertheless surprising in that in such a support, large areas of the dense layer are covered by areas of the support between pores. It would therefore, appear that a support formed in such a manner would inhibit flux performance. Surprisingly, flux performance is enhanced because permeation resistance is far reduced below that of prior art supports with networks of interconnected pores.

The pores can be of cylindrical configuration or of conical configuration. A porous layer can be located between the dense layer and the support layer to distribute permeated oxygen to the support layer and in case of the use of the composite oxygen ion transport element in a chemical reactor, to allow a hydrocarbon containing feed to reach the dense layer and thereby react with the oxygen. The presence of such a porous layer will act to further increase flux performance. In order to provide creep resistance at high temperatures and pressures, the support layer can be formed of an oxide dispersion strengthened metal, a metal-reinforced intermetallic alloy, a boron-doped $Mo_5Si_3$-based intermetallic alloy or combinations thereof. The support layer can of course also be formed of a ceramic. A ceramic that has the ability to withstand high temperatures and pressures higher than about 1000° C. and a pressure higher than about 300 psi is ceria toughened zirconia, yttria toughened zirconia and gadolinium doped ceria.

The support layer can have a porosity of between about 5% and about 90% and an average pore diameter of between about 1 microns and about 500 microns. Where the layered structure has a porous layer located between the dense layer and the support layer to distribute permeated oxygen and/or reactant, the porous layer can have an average pore diameter in a range of between about 1 and about 100 microns, a porosity in a range from between about 20% and about 60%, and a thickness in a range of between about 5 and about 200 microns.

The dense layer can be formed from a mixed conductor, a mixture of a mixed conductor and an ionic conductor or a mixture of a mixed conductor, an ionic conductor and a metal or a mixture of a ionic conductor and a metal.

In another aspect, the present invention provides a composite oxygen ion transport element that is specifically designed to withstand high temperature and pressures and is able to be thermally cycled without failure. In accordance with this aspect of the present invention, a layered structure is provided that comprises a dense layer to transport oxygen ions and electrons and a porous support layer to provide mechanical support for the layered structure. The dense layer is formed of a mixture comprising a mixed conductor, an ionic conductor, and a metal. The mixed conductor and ionic conductor are present within the mixture in amounts that establish oxygen ion conduction through the dense layer. In other words either or both the mixed conductor or the ionic conductor can be present within the dense layer in an amount at or above the percolation threshold for oxygen ion conduction or alternatively, although neither are present in an amount at or above the percolation threshold for oxygen ion condition, both contribute sufficient oxygen ion conduction that they have the combined effect of being at or above the percolation threshold for oxygen ion conduction. Also, at least one of the mixed conductor and the metal are present within the mixture in amounts that establish electronic conduction through the dense layer. Again, either or both of the mixed conductor and metal can be present in an amount at or above the percolation threshold for electronic conduction or, although neither are present in an amount at or above the percolation threshold for electronic conduction, they are presents in amounts that have the combined effect of being at or above the percolation threshold for electronic conduction. The porous support layer is fabricated from an oxide dispersion strengthened metal, a metal-reinforced intermetallic alloy, a boron-doped $Mo_5Si_3$-based intermetallic alloy or combinations thereof or ceria toughened zirconia, yttria toughened zirconia or gadolinium doped ceria.

The fabrication of a support layer from the materials set forth above far exceed the performance of prior art materials with respect to creep and oxidation resistance at high temperatures and at high compositional stress. Moreover, it is believed that the use of the three phase mixture for the dense layer in connection with the above support layer materials has synergies that could not have been forecasted by the prior art use of such three phase mixtures. Without being held to any specific theory of operation, the inventors believe that the use of the ionic conductor and metal phases impart a high degree of toughness to the dense layer. "Toughness" here is meant to connote an increase in the area of a stress strain graph of the three phase material over that of the mixed conductor alone. Additionally, the use of the ionic conductor allows the dense layer to be fabricated with a very close thermal expansion coefficient match to the materials making up the support layer to reduce expansion stresses. As a result of the increased toughness, the dense layer will not easily fail as a result of remaining compositional stresses. Thus, the composite element is highly resistant to failure under the most severe of operating conditions. Prior art elements have not demonstrated such robustness.

The layered structure can further have a porous layer located between the dense layer and the support layer. The support layer can have a network of pores that are non-interconnected and each of the pores communicates between opposite surfaces of the support layer. The pores of the support layer can be substantially of cylindrical or conical configuration.

The layered structure can be of tubular configuration or of planar configuration. The support layer specifically can be formed from an oxide dispersion strengthened metal. The mixed conductor can be present within the dense layer at between about 5% by volume and about 90% by volume, the ionic conductor can be present within the dense layer at between about 5% by volume and about 70% by volume, and the metal can be present within the dense layer at between about 5% by volume and about 70% by volume. The mixed conductor and the ionic conductor can be present within the dense layer at no less than about 30% by volume and the mixed conductor and the metal can be present within the dense layer at not less than about 30% by volume.

The metal of the dense layer can be silver or palladium, platinum, gold, rhodium, ruthenium, tungsten, tantalum, titanium, nickel or alloys of two or more such metals which are stable at the operational temperatures or mixtures thereof. The mixed conductor can be described by reference to the formula: $A_rA'_sA''_tB_uB'_vB''_wO_{3-x}$; where A, A', A" are chosen from the groups 1, 2, 3 and the F block Lanthanides; and B, B', B" are chosen from the D block transition metals according to the Periodic Table of the Elements adopted by the IUPAC; wherein $0<r\leq1$, $0\leq s\leq1$, $0\leq t\leq1$, $0\leq u\leq1$, $0\leq v\leq1$, $0\leq w\leq1$, $r+s+t=1$, $u+v+w=1$ and x is a number which renders the compound charge neutral. Preferably, A, A', A" is a Group 2 metal consisting of magnesium, calcium, strontium and barium. Alternatively, the mixed conductor can be a substance described by reference to the following formula: $A'_sA''_tB_uB'_vB''_wO_{3-x}$; where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof and s, t, u, v, w, and x each represents a number from 0 to about 1. Preferably, the mixed conductor is $La_{0.2}Sr_{0.8}Fe_{0.6}Ti_{0.4}O_3$ or $La_{0.2}Sr_{0.8}Fe_{0.6}Cr_{0.4}O_3$. The ionic conductor can be gadolinium doped ceria, samarium doped ceria, yttria stabilized zirconia, ceria, zirconia, scandium stabilized zirconia, lanthanum strontium gallium magnesium oxide or doped bismuth oxide given by the formula MBiOx; where M is yttria, molybdenum or tungsten.

The support layer can have a porosity of between about 5% and about 90% and an average pore diameter of between about 1 microns and about 500 microns. If a porous layer is located between the dense layer and the support layer to distribute permeated oxygen to the support layer, the porous layer can have an average pore diameter in a range of between about 1 and about 100 microns, a porosity in a range from between about 20% and about 60%, and a thickness in a range of between about 5 and about 200 microns.

BRIEF DESCRIPTION OF THE DRAWINGS

While the specification concludes with claims distinctly pointing out the subject matter that Applicants regard as their invention, it is believed that the invention will be better understood when taken in connection with the following drawings:

DETAILED DESCRIPTION

Figure 1:
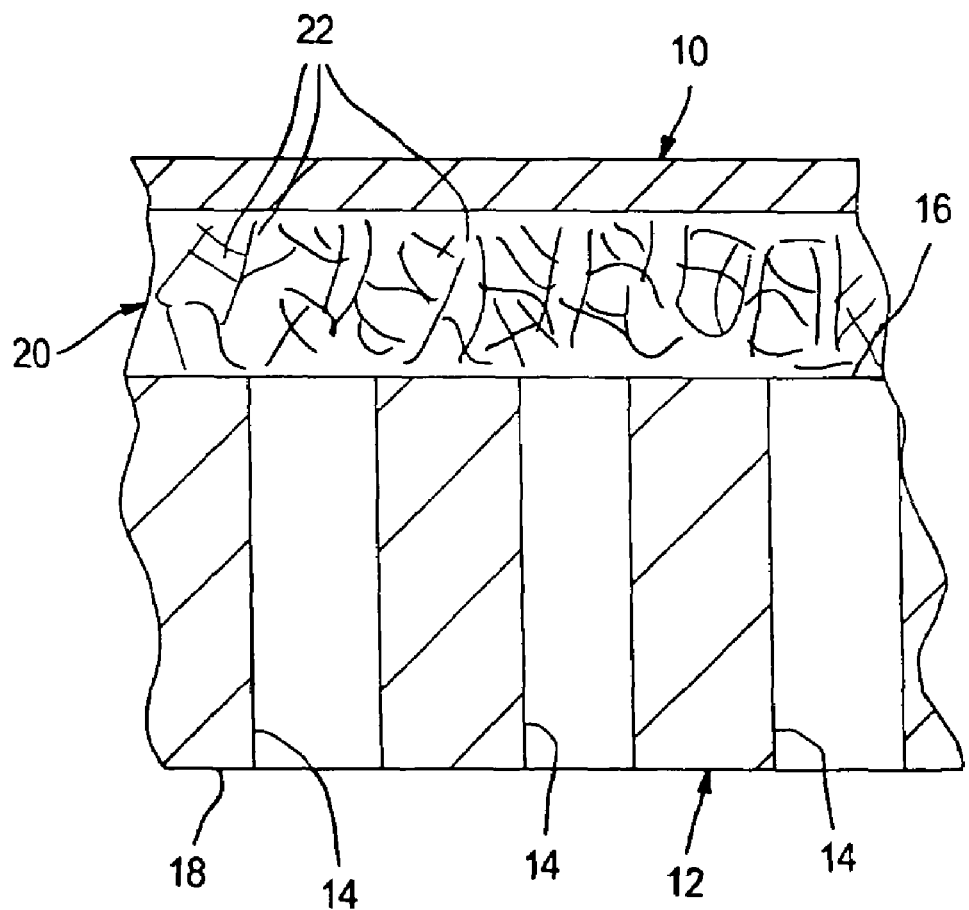
FIG. 1 is a schematic, fragmentary cross-sectional view of an oxygen ion transport element in accordance with the present invention.

With reference to FIG. 1, a composite oxygen ion transport element 1 is illustrated having a dense layer 10 applied to a support layer 12 having a network of pores 14 which are non-interconnected and are of cylindrical configuration. Pores 14 communicate between opposite surfaces 16 and 18 thereof. Composite oxygen ion transport element 1 can additionally be provided with an optional porous layer 20 between dense layer 10 and support layer 12.

In one important aspect of the present invention, the pores 14 are in the form of a network of non-interconnected pores produce very low diffusion resistance and thereby increase the amount of flux as compared with porous structures of the prior art in which the pores connect in a haphazard network through a structure and thus, contribute to diffusion resistance. The pores 14 do not have to be cylindrical and, as will be further illustrated, can be conical or tapered in vertical cross-section. Moreover, the pores do not have to be perfectly straight.

The porous layer 20 improves performance further by acting to distribute permeated oxygen to pores 14 within support layer 12 or alternatively, an oxygen containing feed from pores 14 to dense layer 10 or reactants to the dense layer 10. Porous layer 20 has a network of interconnected pores 22, which as illustrated connect and criss-cross. Porous layer 20 could have a network of non-interconnected pores such as in support layer 12. However, the pores in such layer would be spaced closed together to produce the distribution effect. Porous layer 20 can be made from the same material as dense layer 10 or a mixture of the dense layer 10 material and the support layer 12 for purposes of providing a closer thermal compatibility. However, the porous nature of porous layer 20 imparts a degree of flexibility thereto so as not to require close thermal matching of temperature expansion coefficients. As such, porous layer 20 could be fabricated of a different material than dense layer 10.

Dense layer 10 can be a single phase, that is containing a mixed conductor alone, a dual phase containing an ionic conductor and an electronic conductor or can be a mixture of three phases containing a mixed conductor, an ionic conductor and a metallic electronic conductor. The three phase material is particularly useful where the oxygen ion transport element is to be used at high temperatures, those above 900° C., and is to be thermally cycled and subjected to the high compositional stresses involved in chemical production.

A mixed conductor that can be used in connection with the present invention is given by the formula: $A_r A'_s A''_t B_u B'_v B''_w O_{3-x}$; where A, A', A'' are chosen from the groups 1, 2, 3 and the F block Lanthanides; and B, B', B'' are chosen from the D block transition metals according to the Periodic Table of the Elements adopted by the IUPAC; wherein $0 < r \leq 1$, $0 \leq s \leq 1$, $0 \leq t \leq 1$, $0 \leq u \leq 1$, $0 \leq v \leq 1$, $0 \leq w \leq 1$, $r+s+t=1$, $u+v+w=1$ and x is a number which renders the compound charge neutral. A, A', A'' is preferably, a Group 2 metal consisting of magnesium, calcium, strontium and barium.

Alternatively, another mixed conductor is given by the formula: $A'_s A''_t B_u B'_v B''_w O_{3-x}$; where A represents a lanthanide, Y, or mixture thereof, A' represents an alkaline earth metal or mixture thereof; B represents Fe; B' represents Cr, Ti, or mixture thereof and B'' represents Mn, Co, V, Ni, Cu or mixture thereof and s, t, u, v, w, and x each represents a number from 0 to about 1.

Preferred mixed conductors are either $La_{0.2}Sr_{0.8}Fe_{0.6}Ti_{0.4}O_3$ (hereinafter referred to as "LSFT") or $La_{0.2}Sr_{0.8}Fe_{0.8}Cr_{0.2}O_3$ (hereinafter referred to as "LSFC").

Ionic conductors can be gadolinium doped ceria or samarium doped ceria or yttria stabilized zirconia or ceria, zirconia or scandium stabilized zirconia, lanthanum strontium gallium magnesium oxide or doped bismuth oxide given by the formula MBiOx; where M is yttria, molybdenum or tungsten. Metallic phases can be formed of silver or palladium and other metals that are stable at operating temperature of the oxygen ion transport element 1. Other possible materials are platinum, gold, rhodium, ruthenium, tungsten, tantalum, titanium, nickel or alloys of two or more such metals which are stable at the operational temperatures.

Preferably, the mixed conductor is present within the dense layer 10 at between about 5% by volume and about 90% by volume, the ionic conductor, at between about 5% by volume and about 70% by volume, and the metal, between about 5% by volume and about 70% by volume. The mixed conductor and the ionic conductor are present in sufficient amounts to be above the percolation threshold for oxygen ion conduction. Thus, the mixed conductor or the ionic conductor alone or in combination provide such threshold. Preferably, the mixed conductor and the metal are present in sufficient amounts to be above the percolation threshold for electron conduction. Thus, the mixed conductor or the metal alone or in combination provide such threshold. In this regard, the mixed conductor and ionic conductor are present within the dense layer at no less than about 30% by volume and the mixed conductor and the metal present within the dense layer at not less than about 30% by volume. The foregoing volume percentiles guarantee ionic and electron conduction in accordance with percolation theory.

It is understood that a dense layer fabricated by either single, dual or triple phases as described above can be used with a support layer 12, made of any material compatible with the operational temperature involved, which can be between about 400° C. and about 1200° C., and having pores 14 to provide a low diffusion resistance. It is to be noted that pores 14 could also be of conical configuration. Pores 14 are formed by electron-beam drilling, laser, water jet, or other mechanical process.

Preferably, support layer 12 has a porosity of between about 5% and about 90% and an average pore diameter of pores 14 of between about 1 microns and about 500 microns. Support layer 12 can have a thickness of anywhere from between about 250 microns and about 3 millimeters. The actual thickness used can be more or less than the aforesaid range, depending upon the structural support required for a given application. Porous layer 20, if used, can have an average pore diameter in a range of between about 1 and about 100 microns, a porosity in a range from between about 20% and about 60%, and a thickness in a range of between about 5 and about 200 microns. Dense layer 10 can be between about 1 micron and about 500 microns thick.

Support layer 12 can be formed of an oxide-dispersion strengthened metal alloy to reliably function at high temperatures of up to 1200° C. Such metal alloys contain aluminum, chromium, and iron and yttrium oxide and can be obtained as MA956 alloy from Special Metals Corporation, Huntington, West Virginia, United States or PM2000 alloy from Plancee Holding AG, an Austrian corporation having a place of business at A-6600 Reutte/Tirol Austria. Other possible materials are metal-reinforced intermetallic alloys, for example, Nb-reinforced $Nb_3Al$ ($Nb/Nb_3Al$), Nb or TiNb/TiAl, Mo or Cr/NiAl, $Nb/MoSi_2$, Boron-doped $Mo_5Si_3$-based intermetallic alloys and combinations thereof. Ceramic materials include, yttria toughened zirconia (such as Y-TZP, $ZrO_2$-3% $Y_2O_3$), ceria toughened zirconia (such as Ce-TZP, $ZrO_2$-$xCeO_2$), or gadolinium doped ceria. All of the alloys and ceramics have attractive high temperature properties including good creep resistance and superior mechanical strength. These materials also have high fracture toughness.

A support formed of the foregoing materials can be used in connection with any type of dense layer. However, an oxide-dispersion strengthened metal alloy when used with a three phase mixture for dense layer 10 has been demonstrated as functioning at high temperatures, up to 1100° C. with a stable oxygen flux of about 10 sccm/cm² at 1000° C. over more than about 240 hrs with more than ten thermal cycles and chemical cycles. The use of the pores 14 without tortuosity, preferably cylindrical or conical are particularly advantageous to obtain high flux performance.

It has been found that the best results are obtained when dense layer 10 and optional porous layer 20 are allowed to support layer 12 by plasma spraying techniques. In this regard, other thermal spraying techniques can be used such as high velocity oxygen-fuel spraying techniques. Other application methods include: chemical vapor deposition; electrochemical vapor deposition; physical vapor deposition, e.g. laser ablation, sputtering; tape iso-pressing, slurry/colloidal coating methods; liquid mix/polymeric precursors; and combinations thereof.

In order to coat support layer 12, which may be provided with large pore diameters, the pores should be plugged prior to the application of dense layer 10 or porous layer 20 thereto. This can be done with graphite powder or glue. In case of glue, the surface of support layer 12 to be coated with the porous layer 20 or the dense layer 10 alone should be cleaned such as by sand blasting.

As indicated above, any of the oxygen ion transport elements described above can be used in oxygen generators, nitrogen generators, or reactors in the form of flat plates or tubes that are fabricated by a variety of known techniques. The dense layer could be on either side of the membrane, on the cathode or air side or on the anode or permeate side. In a tubular form, the dense layer could be either inside or outside the tube. A possibility might be to sandwich the dense layer between two porous supports (such as 12) of the present invention having a non-interconnected network of pores and with the optional addition of one or more porous layers (such as 20). Further, any embodiment might include a porous layer of oxygen ion conductive material on the opposite side of the support layer.

In the case of an oxygen generator, an oxygen containing stream, typically air, is heated to a temperature of between about 600° C. and about 1000° C. and introduced to a cathode side of the membrane. Oxygen at the cathode side of the membrane ionizes to form oxygen ions that are transported through the membrane and recombine at an opposite anode side of the membrane to form elemental oxygen. The driving force for the transport is an oxygen partial pressure differential between the cathode and anode sides of the membrane. In this regard, the oxygen containing gas can be compressed from between about 25 psi and about 2500 psi. Furthermore, the oxygen partial pressure at the anode side can be reduced to further reduce the compression requirements for the oxygen containing gas by such known means as steam and other inert gas purges and reactive purges that consume the oxygen. As is well known, the oxygen generator can additionally and alternatively be used to generate a nitrogen rich retentate at the cathode side of the membrane.

The oxygen ion transport elements are particularly advantageous for use within reactors such as reactors used in the formation of synthesis gas due to their ability to operate at high temperatures and endure substantial compositional and operational stresses. In this regard, the reactors could be in combined reforming processes in which one or more of the reactors utilized the oxygen ion transport elements of the present invention. In a particularly advantageous use, the oxygen ion transport elements could be used in a reactor to reform a methane containing feed that was pre-reformed in an adiabatic, catalyst containing pre-reformer to reform higher order hydrocarbons (that is of the form $C_nH_n$; where n is 2 or greater) at low temperature. The reforming of the higher order hydrocarbons at the low temperature prevents coking of the catalyst in a higher temperature reformer or reformers utilizing the oxygen ion transport membrane elements of the present invention in which the bulk of the reforming takes place.

A typical process would involve the compressing of an oxygen containing gas to a pressure of about 30 psia and the heating of such gas to a temperature of about 650° C. to about 950° C. The oxygen containing gas would be introduced to the cathode side of the oxygen ion transport membranes of the reactor. The carbon-containing feed to be reformed could be a natural gas feed that contained steam that was pre-reformed to produce a feed to the reactor that contained methane, hydrogen and carbon monoxide and that was heated to temperatures of between 650° C. and about 950° C. A reforming catalyst, such as $NiO/Al_2O_3$, could be incorporated into such a reactor by installing packed beds of catalyst beads or extrudates or other suitable shape or depositing the catalyst on the anode side of the ion transport membrane or some combination of these methods. The resulting product would be a crude synthesis gas stream containing hydrogen, carbon monoxide, carbon dioxide and water. Typically the hydrogen/carbon monoxide ratio is about 2/1.

The following examples are set forth with specific materials and process conditions to specifically exemplify the methodology involved in forming an oxygen ion transport element of the present invention and the usefulness thereof and should not limit the invention in any way.

EXAMPLE 1

Figure 2:
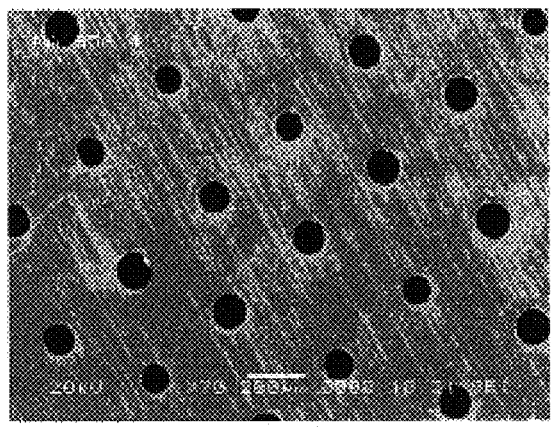
FIG. 2 is a scanning electron micrograph illustrating a top plan view of a support layer in accordance with the present invention.
Figure 3:
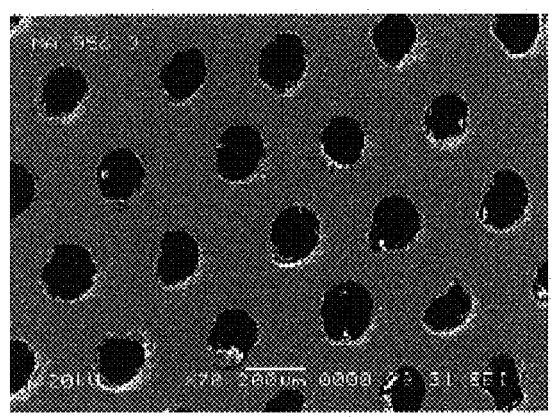
FIG. 3 is scanning electron micrograph illustrating a bottom plan view of a support layer in accordance with the present invention.

A metallic plate, about 1.5 mm in thickness, formed of MA956 alloy was obtained from Special Metals Corp. of Huntington, West Virginia, United States. Discs of about 30 mm in diameter were cut from the plate and perforated by E-beam drilling at Acceleron Inc. of East Granby, Connecticut, United States. The perforations were confined to a central area of the discs of about 16 mm. in diameter to form and thereby simulate support layer 12. The perforations were conical or as viewed in transverse, cross-section as being tapered. Thus, the openings on one side of the resultant support layer 12 had a diameter of about 75 microns as shown in FIG. 2 and the openings on the other side of the support layer 12, as seen in FIG. 3, has a diameter of about 150 microns.

Figure 4:
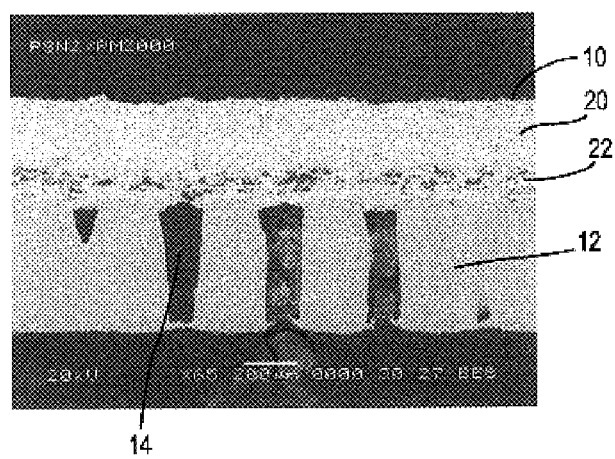
FIG. 4 is a scanning electron micrograph illustrating a fragmentary cross-sectional view of an oxygen ion transport element in accordance with the present invention.

The resultant perforated disc forming the support layer 12 was prepared for coating by using graphite as a pore filler. The disk was then plasma sprayed at the side with openings of about 150 microns with LSFC to produce a porous layer 20 of about 100 microns in thickness followed by a dense layer 10 of about 200 microns in thickness. A transverse cross-sectional view representative of the structure is shown in FIG. 4. The porous LSFC layer was achieved using a pre-mixed powder consisting of LSFC with 40% by weight of graphite.

The resultant, test composite oxygen ion transport element was tested in a high temperature reactor using 90% $CO/10\%$ $CO_2$ and 85% $H_2/15\%$ $CO_2$ gas mixtures for over 2,500 hours and successfully demonstrated 10 thermal cycles with no flux degradation. In this regard, the composite was tested with the dense layer 10 facing the air side at 1 atm at various temperatures from 200 to 1000° C. for about 2,500 hours. Gas mixtures of $CO_2$, CO and $H_2$ were used on the opposite fuel side with all flows (on both the air and fuel sides) set at a flow rate of about 1 liters/min. To observe flux change due to flow rate, flux was recorded with flow rates of 0.5, 1.0, and 1.5 liters/minute. The flow rate on the air side was increased from 1.0 liters/minute to 1.5 liters/min. The flux increased 1.5% resulting in a flux of 15.87 sccm/cm$^2$ as opposed to the 15.68 sccm/cm$^2$ with the fuels being 85% hydrogen and 15% carbon dioxide. When the flow rate on the air side was decreased to 0.5 liters/min the flux decreased 1.6%. This resulted in a flux of 15.42 sccm/cm$^2$ as opposed to the 15.68 sccm/cm$^2$.

Figure 5:
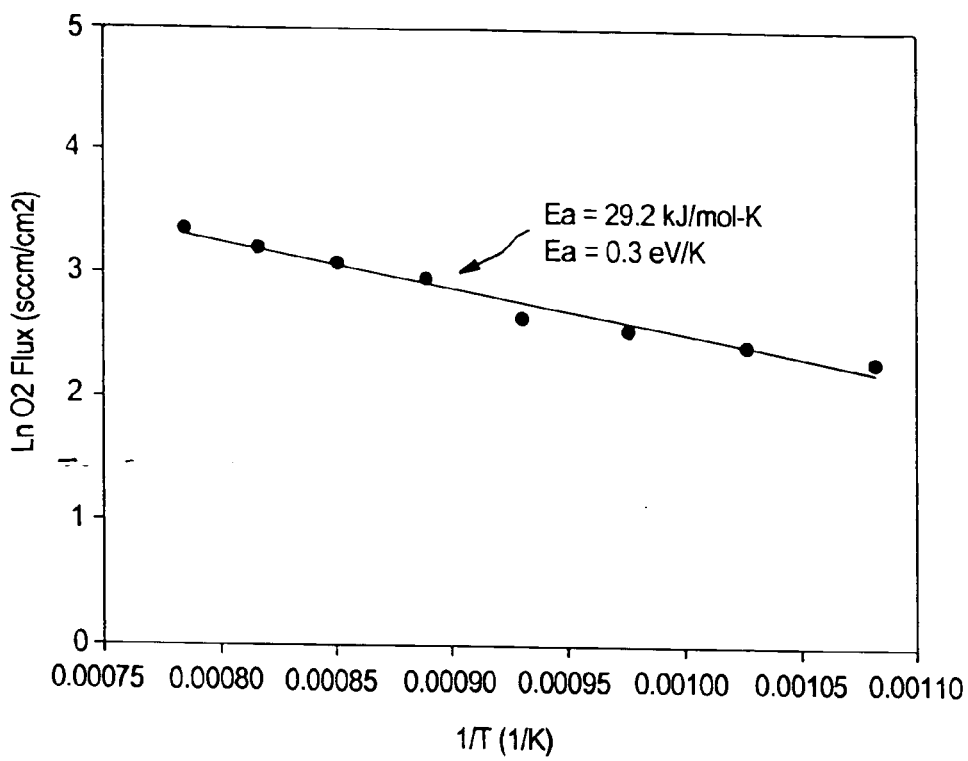
FIG. 5 is an Arrhenius plot of temperature versus flux of the oxygen ion transport element of FIG. 4.

In order to evaluate the effect of temperature on the flux performance, the composite disc was tested every 50 degrees from about 1000° C. to about 600° C. until the flux data could no longer be taken partly due to an increase in the leak rate on the air-side. As shown in FIG. 5, the flux decreased with the testing temperatures. At about 650° C., the flux still remained at about 5.7 sccm/cm$^2$. The calculated activation energy is about 0.3 eV between about 1000° C. and about 650° C. which is lower than that of a dense LSFC disc. After first cycle, the composite was heated to about 1000° C. and the flux remained the same, namely about 15.6 sccm/cm$^2$.

Figure 6:
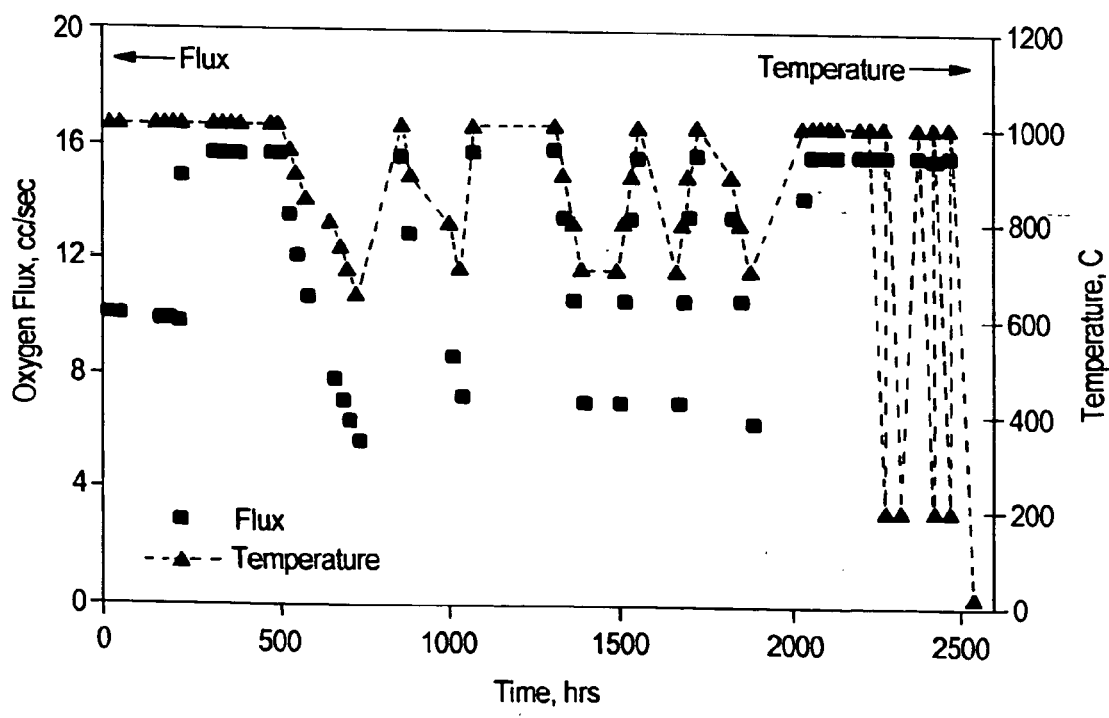
FIG. 6 is a graph of oxygen flux and temperature versus time that indicates the performance of the oxygen ion transport element of FIG. 4 during a testing regimen.

With reference to FIG. 6, the composite was subjected to ten thermal cycles. The first cycle was conducted for the flux performance from about 1000° C. to about 600° C. as mentioned above. The composite was then reheated back up to about 1000° C. where the flux was tested. At the beginning of testing, an oxygen flux of about 10 sccm/cm$^2$ was obtained at about 1000° C. After 200 hours, the flux increased to about 15.6 sccm/cm$^2$ and stable at this temperature for over 500 hrs. It is believed that the increased oxygen flux was due to the further removal of graphite in the support layer 12 that decreased the resistance of gas diffusion. The composite remained stable producing an observed oxygen flux of about 15.6 sccm/cm$^2$ at about 1000° C. after about 2500 hours of testing and 10 complete thermal cycles.

Figure 7:
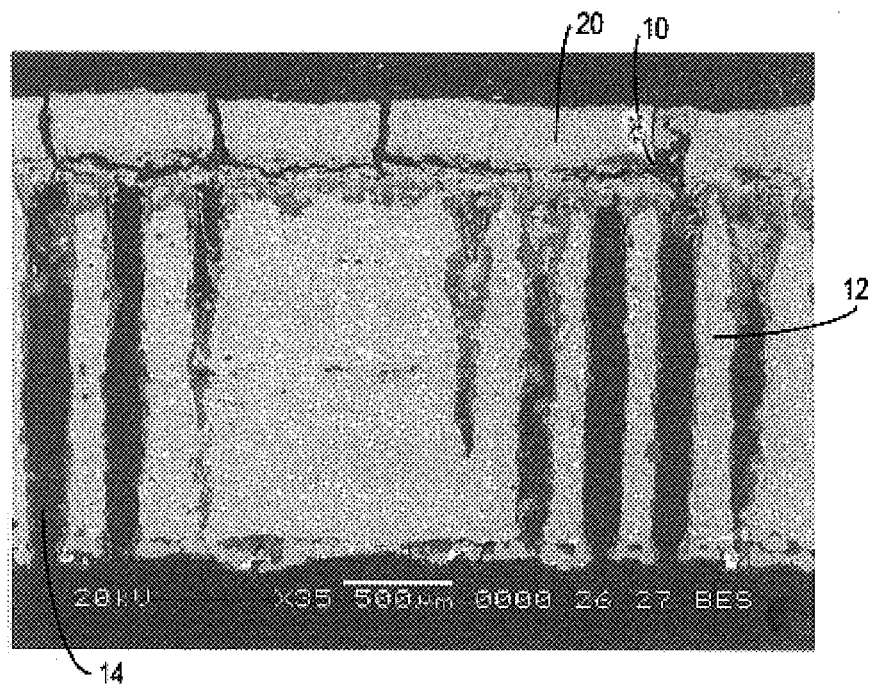
FIG. 7 is a fragmentary cross-sectional view of the oxygen ion transport element of FIG. 4 after having been subjected to the testing regimen of FIG. 6.

The composite was then removed and sectioned. With reference to FIG. 7, thin cracks were seen in dense layer 10 indicating a failure of the dense layer 10. The composite, however, remained useful for separating oxygen and a composite oxygen ion transport element prepared in accordance with this example would adequately function under less severe conditions of lower temperature and less compositional stress.

EXAMPLE 2

In this example, a dense layer 10 was formed using mixed conductors, ionic conductors, and a metallic conductor. In this example, the components were chosen such that the dense layer had a resultant thermal expansion coefficient very close to that of support layer 12 which was fabricated from MA956 alloy.

The dense layer 10 on support layer 12 contained about 40% by weight LSFT, 40% by weight "CGO" ($Ce_{0.8}Gd_{0.2}O$), and about 20% by weight silver. The support layer 1 had a diameter of about 25.4 mm and thickness of about 1.5 mm. The difference between the coefficient of thermal expansion of the dense layer material and the MA956 support layer material is less than 1 ppm/° K. over the range of about 100° C. to about 1000° C.

The material for the dense layer 10 was prepared by first obtaining about 40 grams of LSFT powder having particle sizes of between about 20 and about 30 microns agglomerated from primary particle sizes of between about 0.3 microns and about 0.5 microns, 40 grams of CGO powder having particle sizes of between about 20 and about 30 microns agglomerated from primary particle sizes of between about 0.5 and about 0.6 microns, and 20 grams of silver powder with particle size of between about 2 and about 3 microns. The foregoing components were placed into a plastic vial with a few mixing zirconia balls. The powder mixture was then ball milled for 20 minutes.

A dense layer 10 and a porous layer 20 were applied to the support layer 12. This was done using plasma spraying with standard deposition conditions. Porous layer 20 in direct contact with the support layer was applied with a thickness of about 80 microns to distribute permeated oxygen to the support layer. The pores in the porous layer 20 were achieved using the above three-component mixed powder blended with 40% by weight of graphite having average particles size of 75 microns. The dense layer 10 was then applied to porous layer 20 and was formed using the above mixed three-component powder without graphite. The thickness of the dense layer was about 150 microns. In order to prevent silver evaporation at high temperature, an additional thin porous layer with thickness less than 20 microns of LSFT coating containing no silver addition was plasma sprayed on the surface of the above dense layer. The porous LSFT coating was obtained by spraying the above LSFT powder mixed with 40% wt graphite having average particle size of 75 microns.

Support layer 12 was a perforated disc formed of MA956 allow having a diameter of about 30 mm and a thickness of about 1.5 mm. The pore channels formed by perforation were conical and in the previous example, tapered from 150 microns to about 75 microns. The perforated area was centrally located with a diameter of about 16 mm.

Before the coating process, the perforated channels in the support layer 12 were first plugged with commercially available glue and dried to provide support for the coating materials to be deposited. The dried glue in the channels was then removed by acetone after completion of the coating process.

The composite prepared according to above procedures was then tested in a high temperature disk reactor. The composite was subjected to compositional and thermal cycling to evaluate the cycleability of the composite system under the present invention. Two kinds of cycling were performed in a crossed sequence. Firstly, the composite was heated at a rate of about 1° C./minute to about 1000° C. from room temperature. At 1000° C., the compositional cycling was conducted using two gas mixtures of 90% $CO$/10% $CO_2$ and 85% $H_2$/15% $CO_2$. The gas mixture of either 90% $CO$/10% $CO_2$ or 85% $H_2$/15% $CO_2$ at a flow rate of about 1 liter/minute was fed to the fuel side of the composite, that is at the exposed part of the support layer 12. Air was fed to the air side, that is at the dense layer 10 at a flow rate of about 1 liter/minute. During exposure to the fuel, oxygen fluxes under each gas mixture was measured. After 2.5 hrs exposure to each gas mixture, the gas feeds of air and fuel were terminated to complete a compositional cycle. The composite was then cooled to about 400° C. at a rate of about 1° C./minute to complete a thermal cycle. The thermal and compositional cycling was repeated in such a manner. After completion of 10 thermal and compositional cycles, the disc was cooled to room temperature at a rate of about 1° C./minute and examined by a scanning electron microscope on both, opposite surfaces of the composite.

Figure 8:
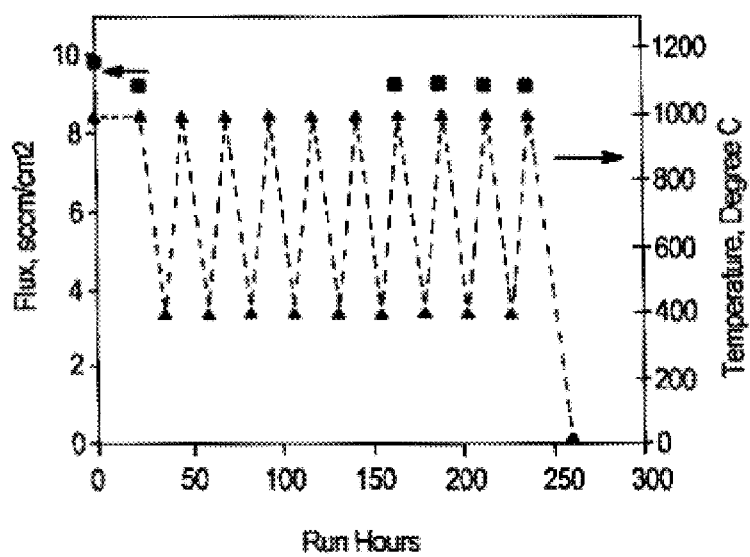
FIG. 8 is a graph of oxygen flux and temperature versus time that indicates the performance of an alternative embodiment of an oxygen ion transport element in accordance with the present invention during a testing regimen.
Figure 9:
FIG. 9 is a scanning electron micrograph illustrating a fragmentary cross-sectional view of an oxygen ion transport element in accordance with the present invention that was subjected to the testing regimen of FIG. 8.

FIG. 8 shows oxygen flux performance and temperature profiles of the disc during thermal cycling. As indicated, the oxygen flux remained stable during and after 10 thermal cycles. With reference to FIG. 9, images of the composite after completing 10 thermal cycles and 10 compositional cycles indicate a good structural integrity with no coating de-bonding after cycling. The coating remained intact with no cracks found on the dense layer 10 or porous layer 20 and will the layers bonded to one another and to support layer 12.

Although the present invention has been described with reference to preferred embodiments, as will occur to those skilled in the art, numerous, changes, additions and omissions may be made without departing from the spirit and scope of the present invention.

We claim:

1. A composite oxygen ion transport element comprising:
   a layered structure comprising a dense layer to transport oxygen ions and electrons, a porous support layer to provide mechanical support for the layered structure and a further porous layer located between the dense layer and the support layer to distribute permeated oxygen to the support layer;
   the porous support layer having a pore structure consisting of a network of non-interconnected pores and each of said pores communicates between opposite surfaces of said support layer and are of cylindrical configuration or conical configuration; and
   the further porous layer having a further pore structure consisting of an interconnected network of pores.

2. The composite oxygen ion transport element of claim 1, wherein the support layer is formed of an oxide dispersion strengthened metal, a metal-reinforced intermetallic alloy, a boron-doped $Mo_5Si_3$-based intermetallic alloy or combinations thereof.

3. The composite oxygen ion transport element of claim 1, wherein the support layer is formed of yttria toughened zirconia, ceria toughened zirconia, gadolinium doped ceria.

4. The composite oxygen ion transport element of claim 1, wherein said support layer has a porosity of between about 5% and about 90% and an avenge pore diameter of between about 1 microns and about 500 microns.

5. The composite oxygen ion transport element of claim 4, wherein
   said pores of said further porous layer have an average pore diameter in a range of between about 1 and about 100 microns, a porosity in a range from between about 20% and about 60%, and a thickness in a range of between about 5 and about 200 microns.

6. The composite oxygen ion transport element of claim 1, wherein the dense layer is fabricated from a mixed conductor, a mixture of a mixed conductor and an ionic conductor or a mixture of a mixed conductor, an ionic conductor and a metal or a mixture of a ionic conductor and a metal.

7. A composite oxygen ion transport element comprising:
   a layered structure comprising a dense layer to transport oxygen ions and electrons and a porous support layer to provide mechanical support for the layered structure;
   the dense layer formed of a mixture comprising a mixed conductor, an ionic conductor, and a metal, the mixed conductor and ionic conductor being present within said mixture in amounts that establish oxygen ion conduction through the dense layer and the mixed conductor and the metal being present within the mixture in amounts that establish electronic conduction trough the dense layer; and
   the porous support layer formed from an oxide dispersion strengthened metal, a metal-reinforced intermetallic alloy, a boron-doped $Mo_5Si_3$-based intermetallic alloy or combinations thereof.

8. The composite oxygen ion transport element of claim 7 wherein the layered structure further comprises a porous layer located between the dense layer and the support layer.

9. The composite oxygen ion transport element of claim 7, wherein the support layer has a network of pores that are non-interconnected and each of said pores communicates between opposite surfaces of said support layer.

10. The composite ion transport element of claim 9, wherein each of said pores is substantially of cylindrical or conical configuration.

11. The composite ion transport membrane element of claim 7 or claim 9 or claim 10, wherein the support layer is formed from an oxide dispersion strengthened metal alloy.

12. The composite oxygen ion transport membrane element of claim 11, wherein the mixed conductor is present within the dense layer at between about 5% by volume and about 90% by volume, the ionic conductor is present within the dense layer at between about 5% by volume and about 70% by volume, and the metal is present within the dense layer at between about 5% by volume and about 70% by volume, the mixed conductor and the ionic conductor present within the dense layer at no less than about 30% by volume and the mixed conductor and the metal present within the dense layer at not less than about 30% by volume.

13. The composite ion transport membrane element of claim 11, wherein the metal is silver or palladium, platinum, gold, rhodium, ruthenium, tungsten, tantalum, titanium, nickel or alloys of two or more such metals which are stable at the operational temperatures or mixtures thereof.

14. The composite ion transport membrane element of claim 11 wherein said mixed conductor is $A_rA'_sA''_tB_uB'_vB''_wO_{3-x}$; where A, A', A" are chosen from the groups 1, 2, 3 and the F block Lanthanides; and B, B', B" are chosen from the D block transition metals according to the Periodic Table of the Elements adopted by the IUPAC; wherein $0<r\leq 1$, $0\leq s\leq 1$, $0\leq t\leq 1$, $0\leq u\leq 1$, $0\leq v\leq 1$, $0\leq w\leq 1$, $r+s+t=1$, $u+v+w=1$ and x is a number which renders the compound charge neutral.

15. The composite oxygen ion transport membrane element of claim 14 wherein A, A', A" of is a Group 2 metal consisting of magnesium, calcium, strontium and barium.

16. The composite oxygen ion transport membrane element of claim 11, wherein said mixed conductor is $A'_sA''_tB_uB'_vB''_wO_{3-x}$; where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof and s, t, u, v, w, and x each represents a number from 0 to about 1.

17. The composite oxygen ion transport membrane of claim 11 wherein the mixed conductor is $La_{0.2}Sr_{0.8}Fe_{0.6}Ti_{0.4}O_3$ or $La_{0.2}Sr_{0.8}Fe_{0.8}Cr_{0.2}O_3$.

18. The composite oxygen ion transport membrane element of claim 11 wherein the ionic conductor is gadolinium doped ceria, samarium doped ceria, yttria stabilized zirconia, ceria, zirconia, scandium stabilized zirconia, lanthanum strontium gallium magnesium oxide or doped bismuth oxide given by the formula MBiOx; where M is yttria, molybdenum or tungsten.

19. The composite ion transport element of claim 11, wherein said support layer has a porosity of between about 5% and about 90% and an average pore diameter of between about 1 microns and about 500 microns.

20. The composite oxygen ion transport element of claim 19, wherein:
   the layered structure further comprises a porous layer located between the dense layer and the support layer to distribute permeated oxygen to the support layer; and
   said porous layer has an average pore diameter in a range of between about 1 and about 100 microns, a porosity in a range from between about 20% and about 60%, and a thickness in a range of between about 5 and about 200 microns.

21. The composite ion transport element of claim 9, wherein said layered structure is of tubular configuration or of planar configuration.

* * * * *